(12) United States Patent
An et al.

(10) Patent No.: US 10,793,438 B2
(45) Date of Patent: Oct. 6, 2020

(54) METHOD OF RECYCLING COMPOSITE CONTAINER FOR HIGH-PRESSURE GAS

(71) Applicant: Hyundai Motor Company, Seoul (KR)

(72) Inventors: Boo Youn An, Seoul (KR); Dong Jun Lee, Gyeonggi-do (KR); Kie Youn Jeong, Gyeonggi-do (KR); Hong Mo Koo, Gyeonggi-Do (KR); Bong Hyun Park, Gyeonggi-Do (KR); Sung Joon Hong, Seoul (KR)

(73) Assignee: Hyundai Motor Company, Seoul (KR)

( * ) Notice: Subject to any disclaimer, the term of this patent is extended or adjusted under 35 U.S.C. 154(b) by 921 days.

(21) Appl. No.: 14/922,119

(22) Filed: Oct. 24, 2015

(65) Prior Publication Data
US 2016/0159649 A1    Jun. 9, 2016

(30) Foreign Application Priority Data
Dec. 5, 2014 (KR) .................. 10-2014-0174110

(51) Int. Cl.
*C01B 32/05* (2017.01)
*B60K 15/03* (2006.01)

(52) U.S. Cl.
CPC ........ *C01B 32/05* (2017.08); *B60K 15/03006* (2013.01); *B60K 2015/03315* (2013.01)

(58) Field of Classification Search
CPC ........... B60K 2015/03013; B60K 2015/03019; B60K 2015/03026; B02C 18/144; B02C 18/28; B02C 19/0081; B02C 19/0087; B02C 19/0093; B02C 19/20; B02C 19/0043; B02C 19/005; B02C 19/0062; B02C 19/10; B02C 19/0056; B02C 4/18; B02C 4/20; B02C 4/10; B02C 4/34; B02C 4/40; Y02W 30/70; Y02W 30/86; Y02W 30/84; Y02W 30/701; Y02W 30/56; Y02W 30/50; Y02W 30/60; Y02W 30/61; Y02W 30/66; Y02W 30/663

See application file for complete search history.

(56) References Cited

U.S. PATENT DOCUMENTS 579,601 A * 3/1897 Neuenschwander ........................ B23D 51/025
269/2
1,747,240 A * 2/1930 Haupt ...................... B26F 1/02
83/354

(Continued)

FOREIGN PATENT DOCUMENTS

CA         2499846 A1 * 9/2006 ............... B02C 4/10
DE    102005001569 A1    7/2006

(Continued)

*Primary Examiner* — Orlando E Aviles
*Assistant Examiner* — Joel D Crandall
(74) *Attorney, Agent, or Firm* — Mintz Levin Cohn Ferris Glovsky and Popeo, P.C.; Peter F. Corless

(57) ABSTRACT

A method of recycling a composite container for a high-pressure gas is carried out so as to recover carbon fibers in a long fiber state, using a recovering apparatus that can separate the inner and outer containers of a composite container for a high-pressure gas such as a hydrogen tank and take carbon fibers out of the outer container without cutting it in order to recycle the composite container, in order to increase the degree of recovery of carbon fibers and improve the efficiency of recycling.

2 Claims, 5 Drawing Sheets

(56) References Cited

U.S. PATENT DOCUMENTS

| | | | | |
|---|---|---|---|---|
| 1,806,434 A | * | 5/1931 | Wilczek | B21D 28/34 |
| | | | | 83/133 |
| 2,967,585 A | * | 1/1961 | Bybee | E04G 1/32 |
| | | | | 182/182.5 |
| 3,460,766 A | * | 8/1969 | Erich | B02C 19/18 |
| | | | | 175/16 |
| 4,243,314 A | * | 1/1981 | Bowe | B26F 1/02 |
| | | | | 346/78 |
| 4,353,399 A | * | 10/1982 | Harris | B23Q 37/00 |
| | | | | 144/134.1 |
| 5,524,837 A | * | 6/1996 | Raynes | B02C 4/08 |
| | | | | 241/14 |
| 2004/0137114 A1 | * | 7/2004 | LaVeine | B03B 9/061 |
| | | | | 426/100 |
| 2014/0326738 A1 | | 11/2014 | Knoop | |

FOREIGN PATENT DOCUMENTS

| | | | | |
|---|---|---|---|---|
| DE | 102008062350 A1 | | 6/2010 | |
| DE | 102013002005 A1 | | 8/2014 | |
| GB | 294068 A | * | 7/1928 | B02C 1/12 |
| JP | 09-012730 | | 1/1997 | |
| JP | 2013-147545 A | | 8/2013 | |
| KR | 10-0658116 B1 | | 12/2006 | |
| KR | 10-2011-0047750 A | | 5/2011 | |
| KR | 10-2013-0017118 | | 2/2013 | |
| KR | 10-1434076 | | 8/2014 | |
| WO | 2014/087003 A1 | | 6/2014 | |

* cited by examiner

<DIVIDED INTO TWO SECTIONS>    <DIVIDED INTO SIX SECTIONS>

<DIVIDED INTO FOUR SECTIONS>

US 10,793,438 B2

METHOD OF RECYCLING COMPOSITE CONTAINER FOR HIGH-PRESSURE GAS

CROSS-REFERENCE TO RELATED APPLICATION

This application claims under 35 U.S.C. § 119(a) the benefit of Korean Patent Application No. 10-2014-0174110 filed on Dec. 5, 2014, the entire contents of which are incorporated herein by reference.

BACKGROUND (a) Technical Field

The present invention relates to a method of recycling a composite container for a high-pressure gas, more particularly, to a method of recycling a composite container for a high-pressure gas so as to recover carbon fibers in a long fiber state, using a recovering apparatus that can separate the inner and outer containers of a composite container for a high-pressure gas such as a hydrogen tank and take carbon fibers out of the outer container without cutting it in order to recycle the composite container, in order to increase the degree of recovery of carbon fibers and improve the efficiency of recycling.

(b) Description of the Related Art

Composite containers for keeping a high-pressure gas are generally composed of an inner container and an outer container. When composite containers for a high-pressure gas are thrown away (i.e., discarded) after use, they cause a large economic loss due to environment pollution and a waste of resources.

It has increasingly become important to recycle the composite containers for a high-pressure gas, inter alia, hydrogen tanks for fuel cell vehicles. Recently, as fuel cell vehicles have been developed in higher production quantities, various regulations must be satisfied, in particular, it is required to achieve a recycling ratio of vehicles under regulations in Korea and Europe. Unlike vehicles with an internal combustion engine, the hydrogen tank accounts for a large portion of the entire weight of fuel cell vehicles, so it is considered necessary to recycle the hydrogen tank in order the satisfy the regulations.

Actually, whether the hydrogen tank of a fuel cell vehicle can be recycled depends in large part on the degree of recycling of the vehicle, as shown in the following Table 1. Table 1 shows the result of analysis and comparison when weight of a fuel cell vehicle that is empty is 1868 kg and the weight of a hydrogen tank is 145 kg in the vehicle's weight.

TABLE 1

| Item | Weight of recycled vehicle (kg) | Degree of recycling of vehicle (%) |
|---|---|---|
| In case of being impossible to recycle hydrogen tank | 1476 | 79.2% |
| In case of being possible to recycle hydrogen tank | 1621 | 86.8% |

Accordingly, it is a necessarily important matter to efficiently recycle composite containers for a high-pressure gas, typically hydrogen tanks, and to recover the recycled resources such that they can be effectively reused without any problems with performance.

In general, containers for a high-pressure gas have been manufactured and used in four types, depending on materials constituting the container, such as a single metal container (type 1) made of metal such as iron or aluminum, a composite container (type 2) manufactured by partially reinforcing a metal container with glass fibers, a composite container (type 3) manufactured by covering an inner container that is an aluminum liner with an outer container made of carbon fibers, and a composite container (type 4) manufactured by covering an inner container that is a plastic liner with an outer container made of carbon fibers. In these types, composite containers for a high-pressure gas of the type 3 or the type 4 have been used all over the world as the hydrogen tank for keeping fuel in fuel cell vehicles.

In the composite containers of the type 3 and type 4, the inner containers of both types can be made of aluminum or thermoplastic material, but the outer containers of both types are commonly composed of a structure that is covered with carbon fiber-reinforced thermosetting resin by filament winding. Therefore, since the inner containers of both types of containers are made of the same material, it is possible to recycle both types of containers by melting and reprocessing them without developing a specific technology, as long as the inner containers can be recovered. However, since the outer containers are made of carbon fiber-reinforced thermosetting resin, it is impossible to recycle them by melting them in the same way as the inner containers.

Further, it has been considered to reuse hydrogen tanks for the same usage in order to recycle them, but there is a limit in reusing the tanks, because of problems such as a decrease in stability due to decreases in quality, performance, and durability of recycled products.

For this reason, hydrogen tanks that become waste after use are not all recycled, but at least some are discarded, e.g., in landfills. Further, disjointing and destroying them by fire for disposal cause a resource waste, an economic waste, and environmental problems that are much worse than common waste products, so it is acutely required to develop a technology of recycling the hydrogen tanks.

On the other hand, in order to recycle carbon fiber-reinforced thermosetting resin that is generally used, the used waste products are reused as reinforcement materials for plastic by crushing them, removing resin, and then recovering them in a short fiber state in some cases, but this recycling also has the following limitations, such as:

1) Too much energy is consumed for crushing the waste products and removing resin.

2) The recovery efficiency is low because carbon fibers are cut and recovered in the short fiber state when the waste products are crushed.

3) There is little opportunity for recycling because the usage of the carbon fibers recovered in the short fiber state is very limited.

4) When the waste products are recovered without crushing, they cannot be reused due to entangling of carbon fibers.

In order to recycle carbon fibers in the related art, there has been proposed, in Japanese Patent Application Publication No. 2013-0147545, a method of manufacturing recycled carbon fibers that thermally decomposes matrix resin from wasted carbon fiber-reinforced plastic by heating the carbon fiber-reinforced plastic in which carbon fibers are impregnated with the matrix resin, and then taking the carbon fibers left after the process as recycled carbon fibers.

Further, there has been proposed a method of manufacturing a fiber composite pellet wherein thermal decomposition or a treatment for a supercritical solvent is utilized to isolate wastes from undesired base materials or carbon fibers, carbon fiber bundles, or composites of them from used parts in Korean Patent No. 10-1434076. In addition, there has been proposed a technology regarding biphasic fiber-reinforced plastic wherein carbon fibers are distributed as reinforcing materials in matrix of thermosetting resin and are recycled carbon fibers that have been recycled by thermally decomposing carbon fiber-reinforced plastic in Japanese Patent Application Publication No. 1997-0012730.

However, such technologies also still have the above-mentioned problems with separating, recovering, and reusing carbon fibers, so they fail to propose an approach capable of effectively recovering carbon fibers existing in a long fiber state in waste products and have other problems that the recovery efficiency is low and the utilization of the recovered materials is low too.

The above information disclosed in this Background section is only for enhancement of understanding of the background of the invention and therefore it may contain information that does not form the prior art that is already known in this country to a person of ordinary skill in the art.

SUMMARY

The present invention provides a recycling method that can improve the degree of recycling a composite container for a high-pressure gas composed of an inner container and an outer container by effectively separating the inner container and the outer container and separating carbon fibers in the outer container in a long fiber state.

Accordingly, the present invention provides a method of recycling a composite container for a high-pressure gas wherein an inner container and an outer container are effectively separated from a composite container and carbon fibers in the outer container are separated in a long fiber state, so that the degree of recycling is considerably improved.

Further, the present invention provides an apparatus for recovering carbon fibers, which is useful for recovering carbon fibers in a long fiber state from a composite container for a high-pressure gas.

In one aspect, the present invention provides a method of recycling a composite container for a high-pressure gas wherein the method comprises: separating a waste composite container for a high-pressure gas, which is composed of an inner container and an outer container, from a facility to which the composite container is attached; cutting the separated composite container; separating the inner container and the outer container from the separated composite container; melting the separated inner container thermally and reprocessing it to recycle; separating and recovering only carbon fibers in the separated outer container using thermal decomposition, with the separated outer container held on a recovery bar of an apparatus for recovering carbon fibers, the apparatus comprising the recovery bar where the separated outer container is held and a pair of supports for supporting the recovery bar; and recycling the recovered carbon fibers.

In another aspect, the present invention provides an apparatus for recovering carbon fibers from a waste composite container, which comprises an outer container including carbon fibers, wherein the apparatus comprises a recovery bar for holding an outer container cut off a composite container for a high-pressure gas and a pair of supports for supporting the recovery bar.

According to the method of recycling a composite container for a high-pressure gas of the present invention, since it is possible to effectively separate an inner container and an outer container from a composite container for a high-pressure gas, it is possible to greatly improve the degree of recycling waste composite containers for a high-pressure gas.

In particular, since it is possible to separate carbon fibers in an outer container of a composite container for a high-pressure gas in a long fiber state, reutilization can be considerably improved.

Further, the method of the present invention provides an approach capable of recycling waste resources that are not reused now as new resources by efficiently improve the problem with the waste resources such as a high cost and high environmental load.

The present invention provides a novel apparatus for recovering carbon fibers, by which carbon fibers in a long fiber state having a continuous length can be recovered, using thermal decomposition in the process of recycling a composite container for a high-pressure gas, so it can be expected to recycle carbon fibers that have been recovered in the same usage as new ones.

Further, since the inner container of a composite container for a high-pressure gas is processed separately from the outer container, all of materials except for thermosetting epoxy that cannot be recycled can be recycled, so it is possible to considerably increase the degree of recovery of waste resources in automotive hydrogen tanks and thus, it is possible to contribute to recycling waste vehicles.

Therefore, according to the method of the present invention, since carbon fibers are recovered in a long fiber state, it is expected to reduce the cost of raw materials by recycling the recovered carbon fibers for automotive parts or industrial materials, so it is an economically useful method.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
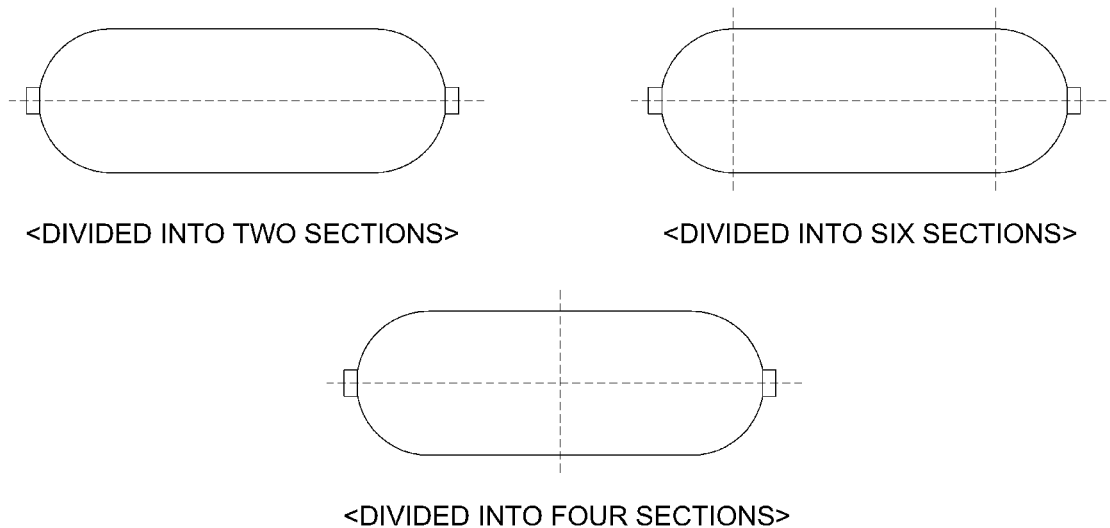
FIG. 1 is a schematic depiction of dividing a composite container for a high-pressure gas into two, four, and six sections, as an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the present invention will be described in detail through exemplary embodiments with reference to the accompanying drawings.

The present invention provides a method of recycling composite containers for a high-pressure gas that have been not reused and discarded, particularly, the materials of an inner container and an outer container from a hydrogen tank. The method comprises: separating a composite container for a high-pressure gas from a facility to which the composite container is attached; cutting the composite container; separating an inner container and an outer container; separating and recovering carbon fibers using an apparatus for recovering carbon fibers; and reusing the recovered carbon fibers.

Composite containers are used independently in some cases, but they are connected to vehicles or apparatuses in most cases. Accordingly, in order to reuse composite containers discarded from facilities including them, it is required to separate the composite containers from the facilities to which the composite containers are attached, removing all the parts associated with the composite containers, and then recover and prepare only the composite containers. The recovered composite containers undergo a cutting process.

In the present invention, it is considered that the composite container to be recycled has the types of a composite container (type 3) manufactured by covering an inner container that is an aluminum liner with an outer container made of carbon fibers and a composite container (type 4) manufactured by covering an inner container that is a plastic liner with an outer container made of carbon fibers. The inner containers are made of aluminum or thermoplastic and the outer containers are all made of carbon fiber-reinforced thermosetting epoxy. That is, in both types of containers, the inner containers are all made of a thermoplastic material, but the outer containers are made of a thermosetting material, so when the same method as in the inner containers is applied to the outer container, recycling of the outer container is impossible. Accordingly, it is necessary to separate the inner containers and the outer containers in order to recycle both of the inner containers and the outer containers. When thermal decomposition is performed to recover and recycle carbon fibers from an outer container without removing an inner container, the aluminum in the type 3 is melted and flows down around the carbon fibers and then just hardens after the thermal decomposition, so carbon fibers cannot be recovered. Further, when the thermoplastic material in the type 4 is thermally decomposed, epoxy and carbon fibers are simultaneously separated, but remaining ashes exist in a large amount around the carbon fibers and thereby deterioration of properties of the recovered carbon fibers is caused, so recycling is impossible. Accordingly, the recycling method performed by separating the inner and outer containers of a composite container may be considered most efficient, including recovering melt melted down thermally from the inner container and then reprocessing the melt, and effectively recovering carbon fibers from the outer container Therefore, in the present invention, the composite container discarded and recovered is cut to easily separate the inner container and the outer container.

According to an embodiment of the present invention, in cutting a composite container for a high-pressure gas, the cutting may be carried out according to any one manner of cutting the composite container into two, four, and six sections as shown in FIG. 1 in consideration of the size of the container and the work efficiency.

The cut container undergoes the separating of the inner container and the outer container.

Figure 2A:
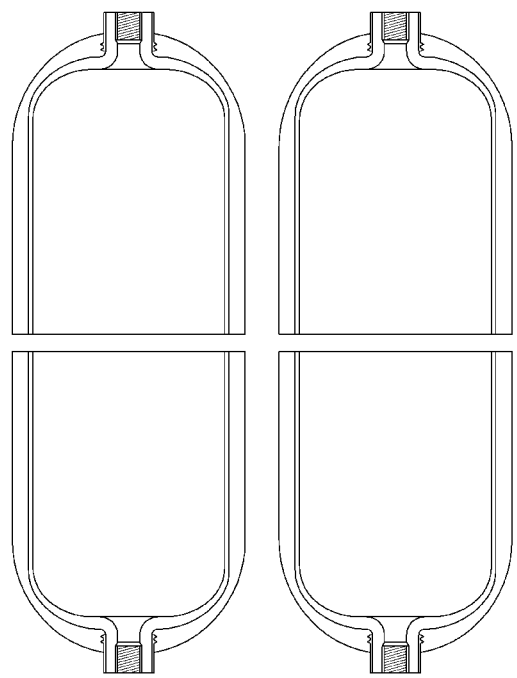
FIG. 2A is a schematic depiction showing a container for a high-pressure gas divided into four sections, as an embodiment of the present invention.
Figure 2B:
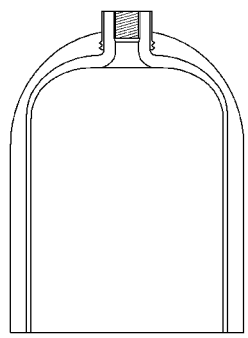
FIG. 2B is a schematic depiction showing the cross-section of one of four sections divided from a container for a high-pressure gas, as an embodiment of the present invention.
Figure 2C:
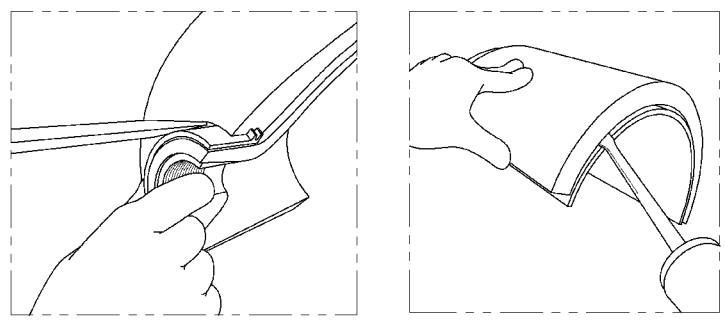
FIG. 2C is a schematic depiction showing a process of separating an inner container and an outer container from a section, as an embodiment of the present invention.
Figure 2D:
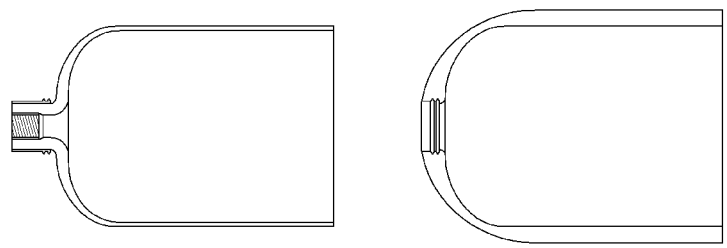
FIG. 2D is a schematic depiction showing the inner container and the outer container that have been separated, as an embodiment of the present invention.

The composite container for a high-pressure gas that has been cut, as described above, can be cut into four parts, as shown in the schematic depiction as an example in FIG. 2A, and one of the sections has the cross-section shown in FIG. 2B. The inner container and the outer container may be manually separated from each other with any simple separation equipment or may by separated by a separation tool appropriate for separation. FIG. 2C is a schematic depiction showing a process of separating an inner container and an outer container, as an embodiment and FIG. 2D is a schematic depiction showing the inner container and the outer container that have been separated.

After the inner container and the outer container are separated, the inner container is reused after melting, reprocessing, and recycling.

In this embodiment, since the inner container is made of one material, no specific preprocessing is necessary and it is possible to recycle the inner container by melting it thermally by a common method in accordance with the material and reprocessing the melt.

On the other hand, the outer container of the separated inner and outer containers undergoes separating and recovering carbon fibers with an apparatus for recovering carbon fibers according to the present invention.

Separating and recovering carbon fibers from the outer container in the present invention is to separate and recover carbon fibers in the outer container, wherein the separated outer container is held on a recovery bar, where the separated outer container can be held, of an apparatus for recovering carbon fibers comprising the recovery rod and a pair of supports for supporting the recovery rod, and then only carbon fibers are recovered from the separated outer container by thermal decomposition.

In general, since the outer containers of composite containers for a high-pressure gas are made of epoxy reinforced with carbon fibers, the composite material itself cannot be recycled for the features of thermosetting materials. Accordingly, it is required to provide a method of recycling an outer container to recover carbon fibers in a fiber state from a composite material and then recycle the recovered carbon fibers. In particular, it is important in this recycling to recover the carbon fibers in the original longest fiber state in order to keep the features of the fiber-reinforced materials. Carbon fibers in composite containers for a high-pressure gas, for example, in the outer container of a hydrogen tank are typically formed in circumferential hoop layers and helical layers in terms of the wound patterns. In the hoop layers, the carbon fibers are 60~90 cm long at the maximum, depending on the size, with the outer container cut.

Figure 3A:
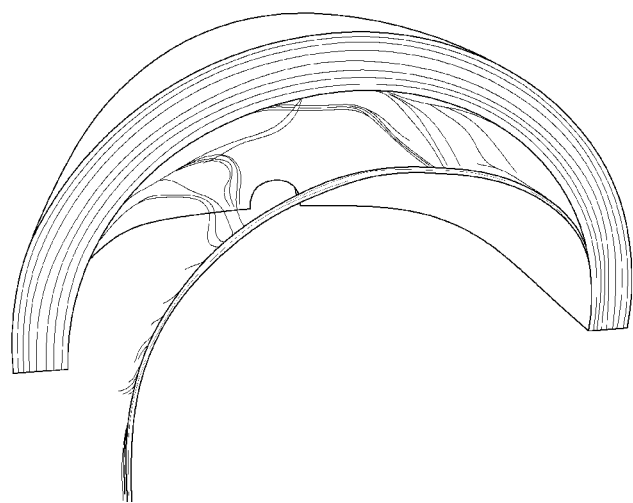
FIG. 3A is a schematic depiction showing carbon fibers in the separated outer container that has been circumferentially cut, as an embodiment of the present invention.
Figure 3B:
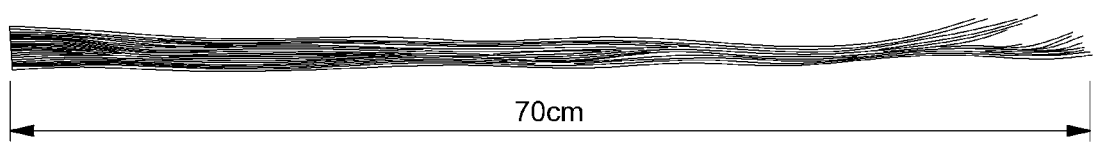
FIG. 3B is a schematic depiction showing the actual length of the carbon fibers in the separated outer container, as an embodiment of the present invention.

That is, in an example shown in FIG. 3A that the outer container is cut circumferentially and the carbon fibers are contained therein, the largest length is about 70 cm, as shown in FIG. 3B.

As described above, thermal decomposition that has been developed in the related art can be used to recover carbon fibers in the outer container of composite containers for a high-pressure gas. In order to recover carbon fibers supported by epoxy using thermal decomposition, the thermal decomposition conditions is 600° C./6 hrs. in the air, but it may be changed depending on the thickness and size of tanks and the density of the outer container of composite materials. However, when carbon fibers are recovered from an outer container by a conventional thermal decomposition method, the epoxy supporting the shape of a tank is thermally decomposed and the carbon fiber layers holding the semicircular shape breaks down, and in this process, the carbon fibers entangle, and as a result, the entangling carbon fibers cannot be recycled. Therefore, recycling such carbon fibers has a limitation that it is necessarily required to cut the carbon fibers into short fibers generally having a length of 10 mm or less.

However, according to the present invention, it is possible to separate carbon fibers in a long fiber state as it is, preferably using an apparatus for recovering carbon fibers in the step of separating carbon fibers by means of thermal decomposition, so that such problem can be solved. The apparatus for recovering carbon fibers that is used in the present invention is provided with a recovery bar where the separated outer container can be held and a pair of supports for supporting the recover rod, so when thermal decomposition is performed with the separated outer container held on the recover rod of the apparatus for recovering carbon fibers, the epoxy resin existing with the carbon fibers in the outer container is removed by thermal decomposition and the carbon fibers can be separated on the recovery rod of the apparatus for recovering carbon fibers, and accordingly, it is possible to recover the carbon fibers uniformly in a long fiber state without entanglement.

Figure 4:
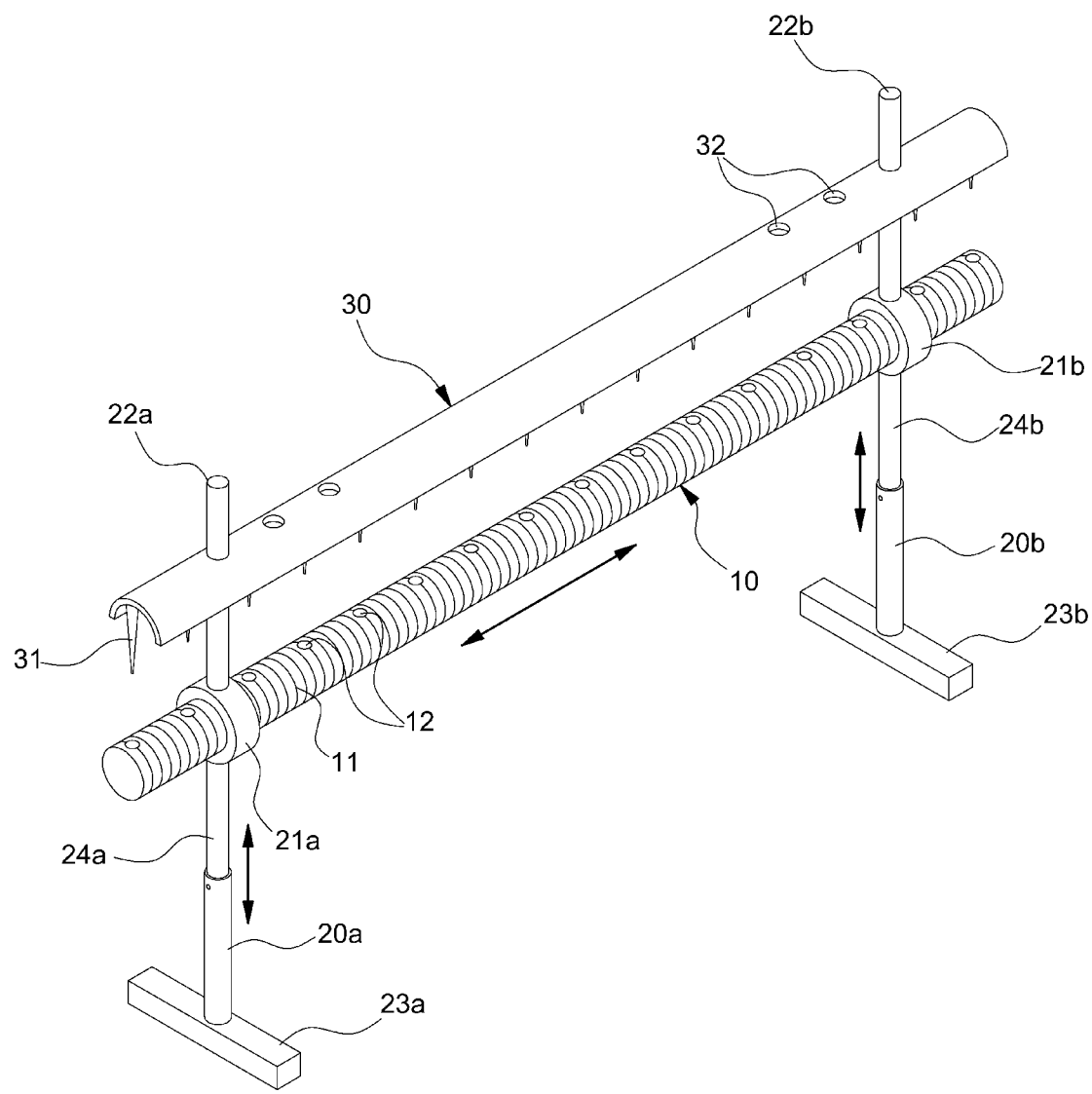
FIG. 4 is a perspective view showing an embodiment of an apparatus for recovering carbon fibers according to the present invention.

According to a preferred embodiment, the apparatus for recovering carbon fibers may be constituted to have the structure shown in FIG. 4 as an example.

The apparatus for recovering carbon fibers shown in FIG. 4 has a structure that a recovery bar 10 is transversely fitted in recovery bard fixing rings 21a and 21b formed at the tops of a pair of supports 20a and 20b for supporting the recovery bar 10, the recovery bar 10 has screw type grooves 11 for adjusting the gap between the supports 20a and 20b and a plurality of fitting holes 12 formed with regular intervals at the upper portion, a fiber separator 40 that is fitted on the recovery bar 10 is disposed over the recovery bar 10, and a plurality of needles 31 is formed with regular intervals on the bottom of the fiber separator and inserted into the fitting holes 12 of the recovery bar 10. A plurality of fixing holes 32 for inserting inserts 22a and 22b vertically extending up from the fixing rings 21a and 21b of the supports 20a and 20b and having a diameter larger than the outer diameter of the inserts 22a and 22b may be formed at both end portions of the fiber separator 30.

Further, according to a preferred embodiment of the present invention, the fitting holes 12 formed at the recovery bar 10 and the needles 31 formed on the bottom of the fiber separator 30 are formed at the same regular intervals so that the fitting holes 12 and the needles 31 can be fitted in any cases.

Further, according to a preferred embodiment of the present invention, the fixing holes 32 at both end portions of the fiber separator 30 are configured to adjust the gap between the supports 20a and 20b using the screw shape grooves 11 to adjust the width of the recovery bar 10 and are formed in several numbers with an regular interval maintained so that they can be fitted into the inserts 22a and 22b on the supports 20a and 20b in the same width.

Further, according to a preferred embodiment of the present invention, the supports 20a and 20b have bases 23a and 23b formed at the bottom to be stably supported on the floor and height adjustment portions 24a and 24b formed at the middle portion for allowing vertical height to be adjusted, so they can be adjusted in height such that the circular surface of an outer container held on the recovery bar 10 can maintain a sufficient gap from the ground, supporting the recovery bar 10 and the fiber separator 30.

Therefore, according to the present invention, in order to separate carbon fibers from an outer container with the apparatus for recovering carbon fibers, the outer container separated from an inner container is held on the recovery bar 10, wherein if necessary, the gap between the supports 20a and 20b is adjusted so that the outer container can be stably held on the recovery bar 10 between the supports 20a and 20b. Thereafter, the fiber separator 30 is fixed on the outer container, wherein the fiber separator 30 is fixed on the outer container by fitting the inserts 22a and 22b of the supports 20a and 20b into desired fixing holes 32 of the fiber separator 30.

Accordingly, the recovery bar 10 is positioned under the circular surface of the outer container and the fiber separator 30 is positioned over the circular surface of the outer container, so that the outer container is positioned between the recovery bar and the fiber separator and held on the recovery bar 10.

Then, when the outer container is thermally decomposed by heat, the epoxy resin in the outer container melted down and recovered downwardly and carbon fibers in the outer container remain while the epoxy resin is thermally decomposed, so only the carbon fibers are naturally hung down on the recovery bar 10. In this process, the fiber separator 30 over the outer container freely falls down and the needles 31 of the fiber separator 30 are naturally fitted into the fitting holes 12 of the recovery bar 10 and hold the carbon fibers, so the carbon fibers are uniformly separated in a given amount between the needles 31.

The height of the recovery bar 10 is adjusted by the height adjustment portions 24a and 24b of the supports 20a and 20b such that the carbon fibers can be maintained at a predetermined distance from the floor, not reaching the floor, even though they are separated and hung down. Accordingly, the carbon fibers can be held without reaching the ashes of the epoxy resin that may fall and lie on the floor after being thermally decomposed from the outer container and collect on the floor.

Figure 5:
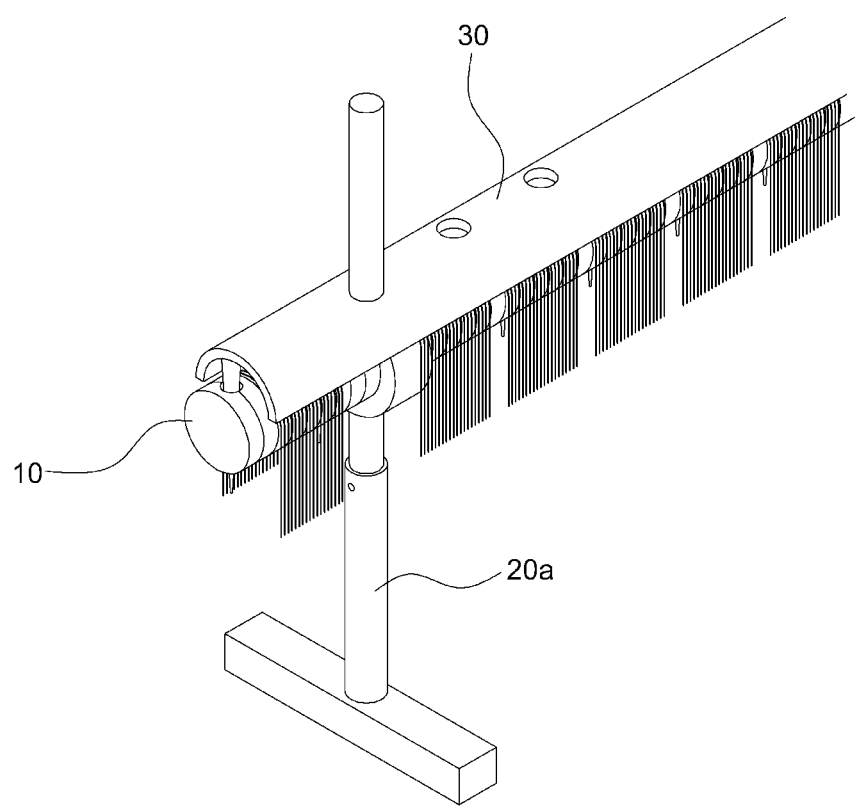
FIG. 5 is a perspective view schematically showing carbon fibers that have been uniformly separated in a long fiber state from an outer container as an embodiment of the present invention.

Carbon fibers separated from an outer container may be in the form, for example, shown in FIG. 5. As can be seen from this figure, the carbon fibers separated and recovered from an outer container are held on the recovery bar, uniformly in a long fiber state without damage.

When carbon fibers are separated by the apparatus for recovering carbon fibers, as described above, the carbon fibers can be recovered in a long fiber state that keeps the length when they are in the outer container. However, in a case where the apparatus for recovering carbon fibers is not used, since carbon fibers are messed up and recovered in the entangled state and thus, cannot be reused in a long fiber state, the recovered carbon fibers must be cut and thus, can be reused in a short fiber state, thereby decreasing the utilization.

The carbon fibers that are recovered, as described above, may have some properties deteriorated in comparison to new ones, but they are recovered in the long fiber state, so they can be reused as fiber reinforcement materials in the same usage as new ones, through RTM (Resin Transfer Molding) and LLD (Liquid Lay Down). Further, it is possible to use continuous long fibers as reinforcement materials for thermoplastic resin by chopping them into short fibers.

As described above, according to the present invention, since an inner container and an outer container are separated from a composite container for a high-pressure gas and then recycled, it is possible to separately recover the materials of the parts, and particularly, recover expensive carbon fibers in a long fiber state, so efficiency of recycling is considerably improved.

The method of recycling a composite container for a high-pressure gas according to the present invention is useful particularly for hydrogen tanks. Automotive hydrogen tanks are appropriate to be applied to the method.

The present invention will be further described in detail hereafter on the basis of examples but the present invention is not limited to those embodiments.

Examples 1 to 3 and Comparative Examples 1 and 2

An automotive hydrogen tank weighing 145 kg was divided into six sections and then an inner container and an outer container were separated from one of the sections. Next, carbon fibers were separated from the outer container separated from the inner container by thermal melting using the apparatus for recovering carbon fibers shown in FIG. 4.

A test of tensile strength was performed on the separated and recycled carbon fibers (Examples 1 to 3), new carbon fibers (Comparative example 1), and new glass fibers (Comparative example 2). The result was shown in the following Table 2.

TABLE 2

| Item | Tensile strength (MPa) | Evaluation |
|---|---|---|
| Example 1 | 4069 | |
| Example 2 | 4002 | |
| Example 3 | 4105 | |
| Example (average) | 4048 | 90% of new carbon fibers |
| Comparative example 1 | 4550 | |
| Comparative example 2 | 2460 | 55% of new carbon fibers |

It was found from Table 2 that the carbon fibers (Examples 1 to 3) recovered and recycled from an outer container of a composite container for a high-pressure gas according to the present invention decreased in tensile strength by about 10% in comparison to the new carbon fibers (Comparative example 1), but increased by about 170% in comparison to the new glass fibers (Comparative example 2).

Therefore, it was found that the carbon fibers recovered and recycled in accordance with the present invention are appropriate to be used as carbon fiber reinforcement materials.

INDUSTRIAL APPLICABILITY

The method of the present invention is very useful for waste composite containers for a high-pressure gas in which the inner container is a liner made of metal such as aluminum or a plastic liner and the outer container is made of a carbon fiber material.

In particular, it is possible to fully recover carbon fibers used for an outer container of a composite container for a high-pressure gas in a long fiber state, so reutilization is very high.

Further, the method is suitable especially for hydrogen tanks of composite containers for a high-pressure gas, so it is suitable for recycling automotive hydrogen tanks in the automotive industry that regulates the degree of recycling.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for recovering carbon fibers from a waste composite container for a high-pressure gas, which includes an outer container having carbon fibers, the apparatus comprising:
   a recovery bar for holding the outer container cut off the composite container; and
   a pair of supports for supporting the recovery bar,
   wherein the recovery bar is transversely fitted in a plurality of recovery bar fixing rings formed at tops of the pair of supports for supporting the recovery bar,
   wherein the recovery bar has screw type grooves for adjusting a gap between the supports and a plurality of fitting holes formed at regular intervals at an upper portion,
   wherein a fiber separator that is fitted on the recovery bar is disposed over the recovery bar,
   wherein a plurality of needles are formed at regular intervals on a bottom of the fiber separator and inserted into the fitting holes on the recovery bar,
   wherein a plurality of fixing holes for inserting inserts vertically extending up from the fixing rings of the supports and having a diameter larger than an outer diameter of the inserts are formed at both end portions of the fiber separator,
   wherein each support has a base formed at a bottom to be stably supported on a floor, and a middle portion of each support comprises a height adjustment portion for allowing a vertical height to be adjusted, so the supports are adjustable in height such that a circular surface of the outer container held on the recovery bar can maintain a gap from the ground for supporting the recovery bar and the fiber separator, and
   wherein the fixing holes at both end portions of the fiber separator are configured to adjust the gap between the supports using the screw type grooves to adjust an allowable width of the recovery bar, and the fixing holes are spaced apart with a regular interval so that the inserts on the supports can be fitted in the fixing holes.

2. The apparatus of claim 1, wherein gaps between the fitting holes of the recovery bar and gaps between the needles on the bottom of the fiber separator are the same such that the fitting holes and the needles can be fitted to each other.

* * * * *